United States Patent [19]

Lawson et al.

[11] Patent Number: 4,812,244

[45] Date of Patent: Mar. 14, 1989

[54] WELL DRILLING FLUIDS AND PROCESS FOR DRILLING WELLS

[75] Inventors: Horace F. Lawson, Downington, Pa.; Arthur H. Hale, Sand Springs, Okla.

[73] Assignee: Pony Industries, Inc., New York, N.Y.

[21] Appl. No.: 100,460

[22] Filed: Sep. 24, 1987

Related U.S. Application Data

[63] Continuation of Ser. No. 808,714, Dec. 13, 1985, abandoned.

[51] Int. Cl.$^4$ ................................................ C09K 7/02
[52] U.S. Cl. .................................. 252/8.514; 252/8.51
[58] Field of Search ............................ 252/8.51, 8.514

[56] References Cited

U.S. PATENT DOCUMENTS

| | | |
|---|---|---|
| 2,552,775 | 5/1951 | Fischer et al. . |
| 3,730,900 | 5/1973 | Perricone et al. . |
| 3,764,530 | 10/1973 | Burland et al. . |
| 4,476,029 | 10/1984 | Sy et al. . |
| 4,478,727 | 10/1984 | Turner et al. . |
| 4,554,307 | 11/1985 | Farrar et al. . |
| 4,581,147 | 4/1986 | Branch, III . |

*Primary Examiner*—Herbert B. Guynn
*Attorney, Agent, or Firm*—J. R. Magnone; A. J. Good

[57] ABSTRACT

The rheological characteristics of aqueous well drilling fluids are improved by incorporating into the fluids small amounts of sulfonated styrene-maleimide copolymers and at least one water-soluble polymer prepared from acrylic acid or acrylate or their derivatives.

8 Claims, No Drawings

WELL DRILLING FLUIDS AND PROCESS FOR DRILLING WELLS

This application is a continuation of application Ser. No. 808,714 filed Dec. 13, 1985, now abandoned.

BACKGROUND OF THE INVENTION

This invention relates to aqueous well drilling fluids and more particularly to improved dispersants for aqueous well drilling fluids.

When drilling wells, particularly oil and gas wells it is common practice to circulate a liquid medium into the borehole. The liquid medium, commonly referred to as a drilling fluid or a drilling mud, serves several functions in the well-drilling process. For example, the drilling fluid serves as a vehicle for removing drilling cuttings from the borehole. Another function of the drilling fluid is to cool and lubricate the drill bit. Other functions are to support part of the weight of the drill string and to transmit hydraulic power to the drill bit. Another consideration is that the drilling fluid should be formulated and applied in such a manner that minimal formation damage results and therefore, minimal clogging of the oil-bearing strata occurs. To accomplish these functions the drilling fluid should have three properties: It must provide weight, i.e. hydrostatic head; it must have good flow properties, i.e. good rheological properties; and it must provide filtration control.

A drilling fluid is essentially one of three types; a solids laden fluid with an aqueous continuous phase; a solids laden fluid with a hydrocarbon base; and gaseous. The present invention concerns the first category, that is well-drilling fluids having a continuous aqueous phase, commonly referred to as aqueous drilling fluids.

One of the principal problems encountered in well-drilling operations is that the drilling process requirements continually change due to continuously changing drilling environments. For example, as the depth of the well increases the temperature and pressure in the region of the drill bit increases. Furthermore, contaminants such as drill cuttings, formation water and salts enter the drilling zone. Also, as the drilling proceeds through different strata the mineral constitution of the earth changes. To minimize any adverse effect from these factors additives are incorporated into the drilling fluid from time to time. The present invention relates to one of these additives, a dispersant (also commonly referred to as a "thinning agent").

DESCRIPTION OF THE PRIOR ART

The principal function of the dispersant in a drilling fluid is to maintain the properties of the drilling fluid in the various environments encountered by the drilling fluid. Many different dispersants have been used in the past with varying degrees of success. Earlier dispersants included phosphates, tannins, lignite and lignin (lignosulfonate). These earlier dispersants had serious shortcomings, such as ineffectiveness at higher temperatures and sensitivity to salts, such as sodium- and calcium-based materials.

Later dispersants, such as polyacrylates and copolymers of styrene and maleic anhydride have superior performance at high temperatures but these materials likewise have drawbacks. Sulfonated styrene-maleic anhydride copolymers are quite expensive and are somewhat sensitive to certain environments such as those containing high concentration of salts of calcium and other alkali and alkaline earth metals. Furthermore, these dispersant systems do not always efficiently disperse solids at higher concentration levels such as those resulting from the addition of gel, e.g., bentonite, to drilling muds or resulting from the accumulation of drill cuttings due to poor solids control. Acrylic-based polymers are less expensive than sulfonated styrene-maleic anhydride copolyers but they too exhibit sensitivity to salts. Acrylic-based polymers are effective dispersants of solids, such as bentonite, clays, drill cuttings, etc. Dispersants for well-drilling fluids which can be used in a variety of environments and which are not so subject to the above mentioned shortcomings are constantly being sought. The present invention presents a family of novel well-drilling dispersants which eliminate or lessen the adverse impact of some of the disadvantages of earlier dispersants.

The use of polymeric substances for water treatment has been disclosed in the patent literature. U.S. Pat. No. 4,374,733 (Snyder et al) discloses the use of combinations of styrene-maleic anhydride copolymers and acrylic acid-alkylhydroxy acrylate copolymers as scale inhibitors and dispersants for solid particulate matter, particularly including iron oxide and clay, in cooling water systems. U.S. Pat. No. 4,324,664 (Snyder et al) discloses the use of combinations of acrylic acid-alkyl hydroxylated acrylate copolymers and esters of aliphatic sulpho-dicarboxylic acid as dispersants for inorganic and organic matter in boiler and cooling water systems. U.S. Pat. No. 4,029,577 (Godlewski et al) teaches the use of acrylic acid-hydroxylated alkyl acrylate copolymers to control the formation and deposition of scale and suspended solid matter in aqueous media. U.S. Pat. No. 3,663,448 (Ralston) discloses the use of combinations of amino phosphonate compounds and polyacrylic acid, polyacrylamide or copolymers of acrylic acid and acrylamide to inhibit the formation of scale-forming salts. U.S. Pat. No. 4,209,398 discloses the use of combinations of polymers of ethylenically unsaturated compounds containing carboxyl radicals and phosphates or phosphonates to prevent scale formation. U.S. Pat. No. 2,723,956 (Johnson) teaches the use of copolymers of maleic anhydride and other ethylenic compounds, such as styrene or methyl methacrylate, for boiler scale treatment. U.S. Pat. No. 3,549,538 (Jacklin) discloses the use of combinations of nitrilo phosphonates or nitrilo carboxylates and polymers, such as styrene-maleic anhydride copolymer or acrylic acid homo- or copolymers, as scale inhibiting compositions. U.S. Pat. No. 3,650,970 (Pratt et al) discloses the use of esters of sytrene-maleic anhydride copolymers to inhibit the formation of scale. U.S. Pat. No. 4,288,327 (Godlewski et at) discloses the use of sulfonated styrene-maleic anhydride copolymers to disperse solids, such as iron oxide or clay, in aqueous media.

Some of the above compositions have been described in the patent literature as useful for drilling mud dispersants. For example U.S. Pat. No. 3,730,900 (Perricone et al) discloses the use of sulfonated styrene-maleic anhydride copolymers as dispersants for aqueous drilling fluids. U.S. Pat. No. 4,518,510 (Gleason et al) discloses the use of water-soluble sulfonated vinyl toluene-maleic anhydride copolymers as dispersants for drilling muds. U.S. Pat. No. 4,478,727 (Turner et al) discloses water-based drilling muds containing, as a viscosity control additive, a copolymer of sulfonated styrene and sulfonated N-phenyl maleimide.

OBJECTS

It is an object of the invention to present novel dispersant systems for well-drilling fluids. It is a another object of the invention to present well-drilling fluids which are particularly effective in high temperature environments. It is another object of the invention to present well drilling fluids which are effective in various substrata. It is another object of the invention to present an improved method for drilling wells in high temperature environments. It is another object of the invention to present an improved method of drilling wells in substrata of varying composition. These and other objects of the invention will become apparent upon reading the following description and examples.

SUMMARY

The above objects are achieved by using as the dispersant in a well-drilling fluid a system comprised of a water soluble sulfonated styrene-maleimide copolymer and one or more water-soluble polymers prepared from acrylic acid or acrylamide, derivatives of acrylic acid and/or acrylamide or mixtures of any of these monomers. Details relating to the molecular weight ranges of these polymers and their dosages and relative proportions are disclosed in following description.

DETAILED DESCRIPTION

Any suitable maleimide monomer can be used in the preparation of the sulfonated styrene-maleimide copolymer.

Particularly suitable maleimide monomers are represented by the general formula:

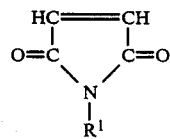

wherein $R^1$ represents: hydrogen; an alkyl group, a halogen, nitrogen, oxygen, sulfur or phosphorus substituted alkyl group; a cycloalkyl group; a halogen, nitrogen, oxygen, sulfur, phosphorus or carbon-substituted cycloalkyl group; a non-aromatic heterocyclic group containing nitrogen, sulfur or phosphorus; an aryl group; a halogen, nitrogen, oxygen, sulfur, phosphorus or carbon-substituted aryl group; or an aromatic heterocylic group containing nitrogen, sulfur or phosphorus.

Examples of maleimide monomers which may be used in the preparation of the additives of this invention are: maleimide, N-phenyl maleimide, N-ethyl maleimide, N-(2-chloroopropyl) maleimide, N-cyclohexyl maleimide, N-pyrrole-maleimide, 4-diphenyl maleimide, 1-naphthylmaleimide, 2,6-diethylphenyl maleimide, 2-,3-, and 4-chlorophenyl maleimide, 4-bromophenyl maleimide, 2,4,6-trichlorophenyl maleimide, 2,4,6-tribromophenyl maleimide, 4-n-butylphenyl maleimide, 2-methyl-4-n-butylphenyl maleimide, 4-benzylphenyl maleimide, 2-, 3- and 4-methylphenyl maleimide, 2-methoxy-5-chlorophenyl maleimide, 2-methoxy-5-bromophenyl maleimide, 2,5-dimethoxy-4-chlorophenyl maleimide, 2-, 3- and 4-ethoxyphenyl maleimide, 2,5,diethoxyphenyl maleimide, 4-phenoxyphenyl maleimide, 4-methoxy-carbonylphenyl maleimide, 4-cyanophenyl maleimide, 2-, 3- and 4-nitrophenyl maleimide, and the like, and their mixtures. The N-aryl and substituted aryl maleimide monomers are preferred.

A particularly suitable polymerization technique for the formation of such copolymers of recurring units of the selected maleimide monomer, styrene and optionally, carboxyl-containing monomer is conventional free radical polymerization in solution, in bulk or by suspension.

Alternatively, the polymerization of styrene with a cyclic anhydride, followed by imidization of the cyclic anhydride units to their imide derivatives by reaction with an amine is also suitable. This polymerization/imidization route and usable monomers are well known and are described in U.S. Pat. No. 3,840,499, the teachings of which are incorporated herein by reference. The polymers produced using this method may be completely imidized. Alternatively, they may be partially imidized and/or partially dehydrated, in which cases they can also contain recurring units of maleic anhydride and/or aminomaleic acid.

Copolymers of styrene and maleic anhydride have been found particularly suitable for use with this alternative polymerization/imidization route and are commercially available. Suitable styrene-maleic anhydride copolymers are available from ARCO Chemical Company Division of Atlantic Richfield Company under the designation SMA ® Resins.

Optionally, if a terpolymer is desired, any carboxyl-containing monomer which is polymerizable with the styrene and maleimide monomers can be used as a comonomer. Alternatively, as described above, a minor amount of carboxyl-containing monomer may be present due to incomplete imidization if the polymerization/imidization technique is used.

Particularly suitable carboxyl-containing monomers are represented by the general formula:

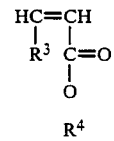

wherein $R^3$ represents hydrogen; an alkyl group; an aryl group; or

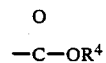

and $R^4$ represents hydrogen; an alkyl group or an aryl group.

Examples of carboxyl-containing monomers which may be used in the preparation of the additives of this invention are: acrylates and methacrylates and their amides, esters, anhydrides and salts; maleic anhydride or maleic acid and its esters, amides and salts and the like, and their mixtures.

The styrene-maleimide must be sulfonated in order to be suitable for use in water-based drilling fluids. In addition to the styrene the maleimide moiety of the copolymers may possess an aromatic site suitable for the succeeding sulfonation reaction.

Sulfonation of the polymers may be achieved using any conventional sulfonation method and is carried out in any solvent which is inert to the sulfonating agent and whose solvency is high enough to dissolve the polymer. Conventional sulfonating agents include chlorosulfonic acid, liquid sulfur trioxide, sulfuric acid and the like. The sulfonic acid groups on the polymers will typically be present in neutralized form as alkali metal salts, particularly as sodium or potassium salts. The amount of or degree of sulfonation of the polymeric additives of this invention is critical only to the extent that the polymers must be sulfonated to the extent that they are at least partially soluble in the water-based drilling fluid composition.

Although the polymers must be sulfonated, under certain conditions it may not be necessary to have them undergo a separate sulfonation step. For example, if a sulfonated monomer such as styrene sulfonic acid or a sulfonated maleimide monomer is selected, polymerization alone will result in a sulfonated polymer and thus the need to have the polymer undergo a separate sulfonation step can be eliminated. Also, if a sulfonated styrene/maleic anhydride coolymer, such as SSMA-1000, commercially available from ARCO Chemical Company Division of Atlantic Richfield Company, is employed with the imidization technique described above, the separate sulfonation step is not necessary since the resulting imidization product is a sulfonated styrene/N-phenylmaleimide copolymer. SSMA-1000 has a styrene to maleic anhydride ratio of 1/1 and a presulfonation number average molecular weight of 1600 as determined by vapor phase osmometry.

Examples of styrene-maleimide copolymers useable in this invention are: sulfonated styrene/N-phenylmaleimide copolymer, sulfonated styrene/maleic anhydride/N-phenylmaleimide terpolymer, sulfonated styrene/anilinomaleic acid/maleimide terpolymer, sulfonated styrene/maleimide, sulfonated styrene/maleic anhydride/maleimide terpolymer, sulfonated styrene/sodium acrylate/maleimide terpolymer, sulfonated styrene/acrylamide/maleimide terpolymer and the like, and mixtures of these.

The sulfonated styrene-maleimide copolymer must be substantially water-soluble to perform satisfactorily in the process of the invention. The water-solubility of the sulfonated styrene-maleimide copolymer is influenced by both the molecular weight of the copolymer and the presence of the sulfonate groups on the styrene ring and on the aromatic rings in the copolymer. As the molecular weight of the copolymer increases its water-solubility decreases. Suitable sulfonated copolymers can be prepared from styrene-maleimide copolymers having a lower number average molecular weight limit of about 500 (as determined by vapor phase osmometry). The lower number average molecular weight limit is generally about 1000 and preferably at least about 1500. The upper number average molecular weight limit is generally about 15,000 and usually not greater than 10,000. The preferred number average molecular weight limit of the styrene-maleimide is preferably not greater than about 5,000. The above molecular weight limits are before sulfonation and, accordingly, do not include the weighting of the sulfonate groups.

The molar ratio of styrene to total non-styrenic monomer units may vary over a wide range. For example, in the case of a styrene-maleimide copolymer the molar ratio may vary from 100 moles of styrene per each mole of maleimide to about 1 mole of styrene per each 10 moles of maleimide. It is usually preferred to maintain the ratio of styrene units to non-styrenic units in the copolymer in the range of about 10:1 to about 1:4. In the most preferred embodiments the molar ratio of styrene units to non-styrenic units is in the range of about 4:1 to 1:2. The non-styrenic units include maleimide units, maleic anhydride units, units resulting from incomplete imidization and the above-described optional carboxyl-containing monomers.

The water-soluble acrylic polymer may be prepared from a wide variety of acrylic-type monomeric materials. In general, suitable polymers are prepared from monomers of one or more of the following categories: acrylic acid and alkyl-substituted acrylic acids and their salts and ester derivatives and acrylamide and alkyl substituted acrylamides and their derivatives. Copolymers prepared from two or more of these monomers and mixtures of homopolymers and copolymers prepared from these acrylic-type monomers may also be used in the invention.

The acrylic polymer component used in the invention must be water-soluble. Water-solubility is generally accomplished by selecting polymers having upper weight average molecular weight limits of not greater than about 30,000. Usually the upper weight average molecular weight limit is not greater than about 15,000. The preferred upper molecular weight limit is generally about 10,000. The upper molecular weight limit is determined primarily by the water solubility of the polymer. The lower molecular weight limit is generally about 500 (weight average) and is usually about 1,000. The preferred lower weight average molecular weight limit is about 1,500. It is to be understood, of course, that any of the above acrylic-type polymers can be used regardless of molecular weight, provided they are water-soluble.

Suitable acrylic acid and related derivative monomers include acrylic acid, alpha-alkyl substituted acrylic acid, alkyl and hydroxyalkyl esters of acrylic acid and the above-described alpha-alkyl-substituted acrylic acids and the alkali metal salts of acrylic acid and alpha-alkyl substituted acrylic acids.

Alpha-alkyl-substituted acrylic acids include those having 1 to about 6 and preferably 1 to about 3 alpha-alkyl carbon atoms. Typical alkyl acrylic esters are those having about 1 to about 10 and preferably 1 to about 4 alkyl ester carbon atoms. Suitable hydroxyalkyl acrylic esters are those having 1 to about 10 and preferably 1 to about 4 carbon atoms and 1 to about 4 and preferably 1 to about 2 hydroxyl groups in the ester moiety of the molecule. The water-soluble salts include the alkali metal salts, such as the sodium, potassium and lithium salts of acrylic or any of the above-mentioned substituted acrylic acids and the ammonium salts of these acids.

Acrylic acid and derivative acid monomers include acrylic acid, alpha methacrylic acid, alpha ethacrylic acid, etc. The preferred acrylic acid monomers include acrylic acid and alpha methacrylic acid.

Alkyl acrylic esters include methyl acrylate, ethyl acrylate, isopropyl acrylate, butyl acrylate, hexyl acrylate, methyl methacrylate ethyl methacrylic, methyl alphapropyl acrylate, butyl ethacrylate, etc. Preferred alkyl esters are the lower esters, such as methyl acrylate, ethyl acrylate, methyl ethacrylate, ethyl ethacrylate, etc.

Hydroxyalkyl esters of the above acrylic acids include hydroxymethyl acrylate, hydroxyethyl acrylate, hydroxypropyl acrylate, hydroxypropyl methacrylate, 2,3-dihydroxypropyl acrylate, 1,3-dihydroxybutyl methacrylate, etc.

Suitable acrylamide and related derivative monomers include acrylamide, alpha-alkylsubstituted acrylamides containing 1 to about 6 alpha-alkyl carbon atoms and nitrogen mono- or dialkyl substituents each containing 1 to about 6 alkyl carbon atoms.

The relative amounts of sulfonated styrene-maleimide copolymer and acrylic polymer may vary from styrene-maleimide copolymer to acrylic polymer weight ratios of about 90:10 to 5:95, depending upon the particular drilling mud formulation employed and the nature of the formation being drilled. Sulfonated styrene-maleimide copolymer to acrylic polymer weight ratios in the range of about 80:20 to 10:90 are usually preferred for most applications.

The total amount of water-soluble sulfonated styrene-maleimide copolymer and water-soluble acrylic polymer required in the compositions of the invention to produce the desired result will vary over a wide range as the drilling mud formulation and subterranean formation composition vary. In general the required amount of each of these components can vary from about 0.05 lbs/bbl (pounds per barrel of total drilling mud formulation) to about 10 lbs/bbl. Amounts in the range of about 0.1 to 5 lbs/bbl. are usually preferred for most drilling mud applications.

The invention is further illustrated in the following examples in which parts and percentages are on a weight basis, unless otherwise indicated.

EXAMPLE I (Part A)

To a reaction vessel equipped with an agitator and heating means was charged 43.8 parts of methyl isobutylketone (MIBK) and 22.0 parts of a styrene-maleic anhydride copolymer having a styrene to maleic anhydride ratio of 1:1 and a presulfonation number average molecular weight of 1600 (sold by ARCO Chemical Company Division of Atlantic Richfield Company under the trademark SMA ® 1000). The reactor contents was heated to 230° F. (110° C.) while being continuously agitated. Next 17.6 parts of a 50/50 weight percent mixture of aniline and MIBK was added to the reactor at a rate such that the reaction temperature was maintained in the range of 230° to 235° F. (110° to 113° C.). During this step a nitrogen sparge was maintained to facilitate water removal. The reaction mixture was heated for 4 hours at a temperature of 230°–235° F. (110°–113° C.) with continued agitation while maintaining the nitrogen sparge. The reactor contents was mixed with n-hexane at a volume ratio of 3 parts hexane per each part of reaction mixture. The resulting mixture was filtered and the precipitate was dried. Infrared spectral analysis, elemental analysis and acid value determinations indicated that a 62% conversion to styrene-N-phenylmaleimide copolymer (SMI) was obtained.

Part B

The above product was sulfonated by the following procedure: Sulfur trioxide (3.4 parts) wss dissolved in 62.1 parts of ethylene dichloride (EDC). In a separate reaction vessel 5.75 parts of the SMI obtained in Part A was dissolved in 28.75 parts of EDC. The SMI-EDC solution was slowly combined with the sulfur trioxide-EDC solution, producing an exotherm. The rate of mixing was controlled so that the reaction temperature did not exceed 95° F. (35° C.). The resulting mixture was heated to and maintained at 150° F. (65.6° C.) for 1 hour. The resulting mixture was cooled and 32.5 parts of 10 weight percent aqueous sodium hydroxide was added. This mixture was heated to and maintained at 150° F. (65.5° C.) for 1 hour. The water phase, which had a dark amber color, was spray-dried, yielding a fine, yellowish powder which contained 10.2 weight percent sulfur.

EXAMPLE II

A synthetic drilling fluid base mud was prepared as follows: A mixture comprised of 252 g of water and 10 g of bentonite clay was blended in a multimixer sufficiently to hydrate the bentonite. Next 50 g of kaolinite clay and 416 g of barite were blended into the hydrated bentonite and the pH of the resulting mixture was adjusted to 10 with concentrated sodium hydroxide.

Test drilling fluid samples were prepared by blending polymeric dispersants with the above-described base mud at several concentration levels. These levels are equivalent to dispersant loadings of 0.1, 0.15, 0.2 and 0.3 (lbs/bbl.). Test samples of three polymeric dispersants were prepared at each concentration level. The dispersants used in these samples were the sulfonated styrene-maleimide copolymer product of Example I, Part B (SSMI), a sodium acrylate-sodium methacrylate copolymer sold by ChemLink Petroleum Inc. under the trademark OFC ™ 1260 Scale Inhibitor Intermediate and a 50/50 weight percent mixture of the SSMI and OFC 1260. A control sample which contained no dispersant was also prepared. Each of the test samples and the control sample were aged by hot rolling, first at 150° F. (65.5° C.) for 16 hours and then at 400° F. (204.4° C.) for 16 hours. The samples were cooled to room temperature, mixed in a multimixer for ten minutes and tested for rheological characteristics using a Fann Model 35A rheometer. The plastic viscosity (PV) in centipoises (cp) and the yield point in pounds per 100 square feet were calculated and the 10 second and 10 minute gel strengths were measured for each test. The results are tabulated in TABLE I.

TABLE I

| (Control, no dispersant) | |
| --- | --- |
| Plastic Viscosity (PV), cp | 40 |
| Yield Point (YP) lb/100 ft² | 45 |
| 10 Sec gel strength (GS), lb/100 ft² | 25 |
| 10 Min gel strength (GS), lb/100 ft² | 32 |

| DISPERSANT | SSMI | OFC ™ 1260 | SSMI/ OFC 1260 |
| --- | --- | --- | --- |
| Series 1 (0.1 lb/bbl dispersant concentration) | | | |
| PV, cp. | 44 | 54 | 61 |
| YP, lb/100 ft² | 37 | 32 | 19 |
| 10 Sec GS, lb/100 ft² | 24 | 15 | 14 |
| 10 Min GS, lb/100 ft² | 30 | 21 | 19 |
| Series 2 (0.15 lb/bbl dispersant concentration) | | | |
| PV, cp | 47 | 56 | 63 |
| YP, lb/100 ft² | 36 | 28 | 12 |
| 10 Sec GS, lb/100 ft² | 20 | 9 | 9 |
| 10 Min GS, lb/100 ft² | 24 | 16 | 13 |
| Series 3 (0.2 lb/bbl. dispersant concentration) | | | |
| PV, cp | 55 | 57 | 64 |
| YP, lb/100 ft² | 22 | 27 | 9 |
| 10 Sec GS, lb/100 ft² | 15 | 7 | 5 |
| 10 Min GS, lb/100 ft² | 19 | 11 | 11 |
| Series 4 (0.3 lb/bbl dispersant concentration) | | | |
| PV, cp | 61 | 63 | 68 |
| YP, lb/100 ft² | 15 | 15 | 5 |
| 10 Sec GS, lb/100 ft² | 10 | 4 | 3 |
| 10 Min GS, lb/100 ft² | 11 | 7 | 8 |

This example illustrates the benefit obtained by the use of a 50/50 weight percent mixture of SSMI and OFC 1260. Each dispersant-containing sample had better physical property values than the control sample. However, in each run the 50/50 polymer blend sample had better properties than either of the samples containing only one polymer, in almost every case.

EXAMPLE III

Drilling fluid test samples having varying SSMI to OFC 1260 weight ratios were prepared in accordance with the procedure of EXAMPLE II except that the test samples were hot rolled at 150° F. (65.5° C.) for 16 hours. The Runs 2-8 samples contained a total dispersant concentration of 0.3 lb/bbl. The Run 2 sample contained only SSMI dispersant; the Run 8 sample contained only OFC 1260 dispersant and the Runs 3-7 samples contained mixtures of SSMI and OFC 1260 at the indicated weight percentages. Physical tests were conducted on these samples as in EXAMPLE I. The results are tabulated in TABLE II.

TABLE II

| SSMI/Acrylate Weight percentages | Run | | | | | | | |
|---|---|---|---|---|---|---|---|---|
| | 1 | 2 | 3 | 4 | 5 | 6 | 7 | 8 |
| | 0/0 | 100/0 | 90/10 | 75/25 | 50/50 | 25/75 | 10/90 | 0/100 |
| PF,cps | 41 | 59 | 60 | 63 | 65 | 65 | 66 | 62 |
| YP,lbs/100 ft$^2$ | 43 | 21 | 19 | 12 | 7 | 5 | 6 | 16 |
| 10 sec gel, lbs/100 ft$^2$ | 24 | 9 | 6 | 5 | 3 | 3 | 4 | 16 |
| 10 min gel, lbs/100 ft$^2$ | 31 | 12 | 12 | 7 | 5 | 6 | 8 | 9 |

Example III shows the synergistic results obtained by the use of various ratios of SSMI to OFC 1260. Run 1, which contained no dispersant, had the highest yield point and 10 second and 10 minute gel strengths. For the drilling mud tested most of the yield points, 10 second gel strengths and 10 minute gel strengths of the Runs 3 to 7 samples, which contained blends of SSMI and OFC 1260 at various ratios, were lower than the corresponding values for the Run 2 sample, which contained only SSMI and the Run 8 sample, which contained only OFC 1260. The optimum concentrations of the additives will vary as the drilling mud formulation is changed.

Although the specific examples illustrate the invention it is understood that the invention is not limited to the scope of the examples.

What is claimed is:
1. A composition comprised of
   (a) an aqueous base,
   (b) a clayey material suspended in said aqueous base,
   (c) a water-soluble sulfonated styrene-maleimide copolymer having a molecular weight of about 500 to about 15,000,
   (d) a water-soluble copolymer having a molecular weight of about 500 to about 30,000 prepared from alkali metal salts of acrylic acid and methacrylic acid,
the combined total weight of the polymers of (c) and (d) present in the composition being in the range of about 0.05 to about 10.0 pounds per barrel of composition and the weight ratio of the polymer of (c) to the polymer of (d) being in the range of about 90:10 to about 5:95.

2. The composition of claim 1 wherein the ratio of sulfonated styrene units to maleimide units is about 100:1 to 1:10.

3. The composition of claim 1 wherein the clayey material is bentonite.

4. The composition of claim 2 wherein the clayey material is bentonite.

5. In a well-drilling method wherein an aqueous drilling fluid is circulated in the borehole the improvement comprising using as the drilling fluid the composition of claim 1.

6. The improved method of claim 5 wherein the ratio of styrene units to maleic anhydride units in said copooymer is about 100:1 to 1:10.

7. The improved method of claim 5 wherein the clayey material is bentonite.

8. The improved method of claim 6 wherein the clayey material is bentonite.

* * * * *